United States Patent
Im et al.

(10) Patent No.: US 8,801,209 B2
(45) Date of Patent: Aug. 12, 2014

(54) BACKLIGHT ASSEMBLY AND DISPLAY DEVICE HAVING LOWER PROFILE AND/OR REDUCED WEIGHT

(75) Inventors: Hyun-Deok Im, Seongnam-si (KR); Byoung-Ho Cheong, Yongin-si (KR); Young-Chan Kim, Incheon (KR); Seung-Won Park, Seoul (KR)

(73) Assignee: Samsung Display Co., Ltd. (KR)

( * ) Notice: Subject to any disclaimer, the term of this patent is extended or adjusted under 35 U.S.C. 154(b) by 103 days.

(21) Appl. No.: 13/232,906

(22) Filed: Sep. 14, 2011

(65) Prior Publication Data
US 2012/0081882 A1 Apr. 5, 2012

(30) Foreign Application Priority Data
Oct. 1, 2010 (KR) .................... 10-2010-0095930

(51) Int. Cl.
*G09F 13/04* (2006.01)
*G02F 1/1335* (2006.01)
*G02F 1/1333* (2006.01)

(52) U.S. Cl.
CPC ............... *G02F 1/133603* (2013.01); *G02F 2001/133314* (2013.01)
USPC ..................... 362/97.3; 362/249.02

(58) Field of Classification Search
CPC ................... G02F 1/133603; F21Y 2105/001; F21Y 2105/005
USPC ........................... 362/97.3, 249.02
See application file for complete search history.

(56) References Cited

U.S. PATENT DOCUMENTS

| | | | | |
|---|---|---|---|---|
| 4,935,665 A | * | 6/1990 | Murata | 313/500 |
| 2006/0044780 A1 | * | 3/2006 | Kim | 362/29 |
| 2007/0002565 A1 | * | 1/2007 | Han et al. | 362/240 |
| 2007/0030414 A1 | * | 2/2007 | Chang | 349/62 |
| 2008/0285277 A1 | * | 11/2008 | Chang et al. | 362/247 |
| 2009/0128735 A1 | * | 5/2009 | Larson et al. | 349/62 |

* cited by examiner

*Primary Examiner* — Sean Gramling
(74) *Attorney, Agent, or Firm* — Innovation Counsel LLP (57) ABSTRACT

A backlight assembly and a display device having the same are provided. The backlight assembly includes a first substrate, point light sources disposed upon the first substrate and an optical member covering the point light sources to guide light emitted from the point light sources, wherein the first substrate has recessed portions, and the point light sources are positioned within the recessed portions.

29 Claims, 6 Drawing Sheets

BACKLIGHT ASSEMBLY AND DISPLAY DEVICE HAVING LOWER PROFILE AND/OR REDUCED WEIGHT

CROSS-REFERENCE TO RELATED APPLICATION

This application claims priority from Korean Patent Application No. 10-2010-0095930 filed on Oct. 1, 2010 in the Korean Intellectual Property Office, and all the benefits accruing therefrom under 35 U.S.C. 119, the contents of which in its entirety are herein incorporated by reference.

BACKGROUND

1. Field of the Invention

Embodiments of the present invention relate generally to flat panel displays. More specifically, embodiments of the invention relate to a backlight assembly and a display device having lower profile and/or reduced weight.

2. Description of the Related Art

A liquid crystal display (LCD) does not emit light itself and, thus, requires an additional light source. Accordingly, an LCD includes a backlight assembly provided below its liquid crystal panel, where an image is displayed using light emitted from the backlight assembly. Recently, light emitting diodes (LEDs) are being recognized as light sources for such backlight assemblies.

In other words, since light emitting diodes (LEDs) have advantages such as low power consumption, high color reproduction and the like under the same luminance conditions, demand for and production of products having light emitting diodes (LEDs) as light sources are gradually increasing.

A backlight assembly including a circuit substrate having light emitting diodes as light sources can realize high image quality due to low power consumption and high luminance. However, in case of a direct-type backlight assembly, as the size of a display device increases, the number of light emitting diodes increases, thereby increasing the price of the product.

Meanwhile, light emitted from the LEDs of a backlight assembly may be incident on an optical member such as a lens array substrate (lens integrated plate (LIP)), which guides and more uniformly diffuses the light emitted from the light emitting diodes (which are typically arranged separately from each other at regular intervals). To accomplish such light diffusion, the optical member typically should be of at least some sufficient thickness. However, the thickness of the optical member occupies a large proportion of the overall thickness of the backlight assembly. Accordingly, the optical member may make it difficult to make the display device slim, and reduce efficiency due to an increase in traveling distance of light.

SUMMARY

Embodiments of the present invention provide a backlight assembly with improved optical efficiency by reducing manufacturing cost and volume.

Embodiments of the present invention also provide a display device having the backlight assembly.

The objects of the present invention are not limited thereto, and the other objects of the present invention will be described in or be apparent from the following description of the embodiments.

According to an aspect of the present invention, there is provided a backlight assembly including a first substrate, point light sources spatially distributed upon the first substrate, and an optical member covering the point light sources to guide light emitted from the point light sources, wherein the first substrate has recessed portions extending generally away from the optical member, and the point light sources are positioned within the recessed portions.

The other aspects of the present invention are included in the detailed description and drawings.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EMBODIMENTS

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. In the drawings, the size and relative sizes of layers and regions may be exaggerated for clarity.

It will be understood that when an element or a layer is referred to as being "on" or "connected to" another element or layer, it can be directly on or directly connected to the other element, or intervening elements may also be present. In contrast, when an element is referred to as being "directly on" or "directly connected to" another element, there are no intervening elements present. Like numbers refer to like elements throughout. As used herein, the term "and/or" includes any and all combinations of one or more of the associated listed items.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures.

Embodiments of the invention are described herein with reference to plan and cross-section illustrations that are schematic illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Hereinafter, a sensor array substrate, a display device including the same and a manufacturing method thereof in accordance with embodiments of the present invention will be described with reference to the accompanying drawings.

Figure 1:
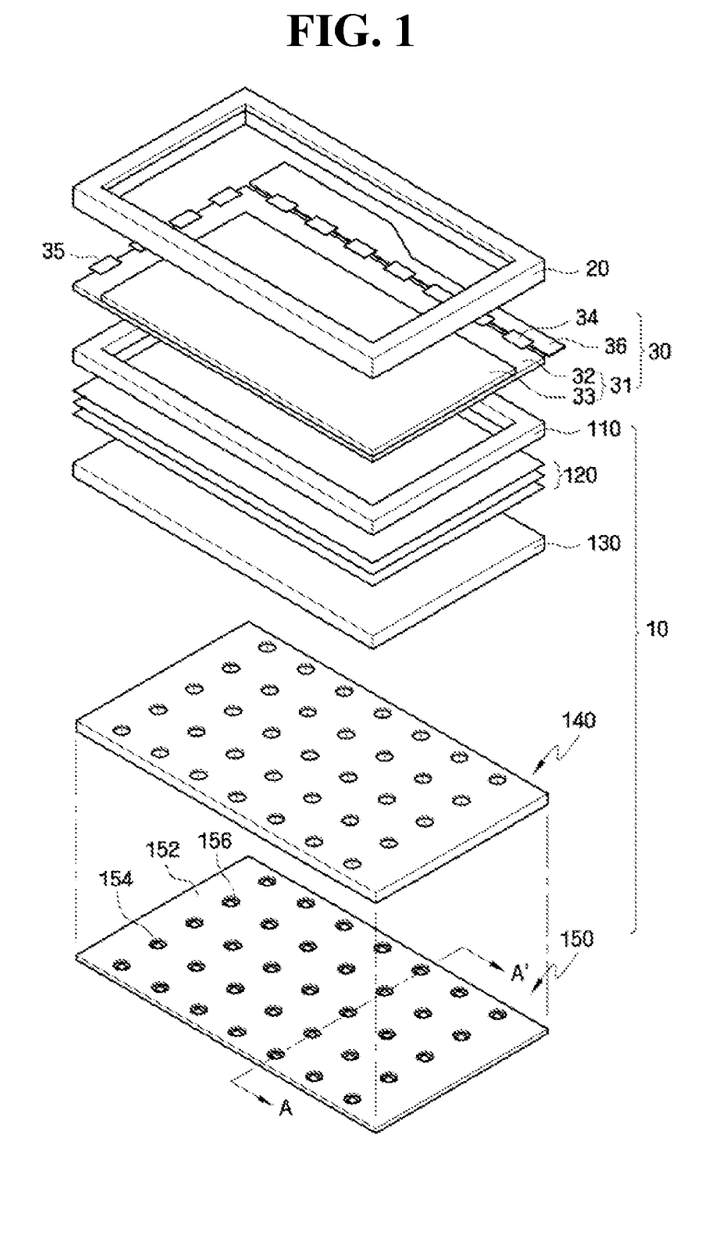
FIG. 1 is an exploded perspective view of a display device in accordance with a first embodiment of the present invention.
Figure 2:
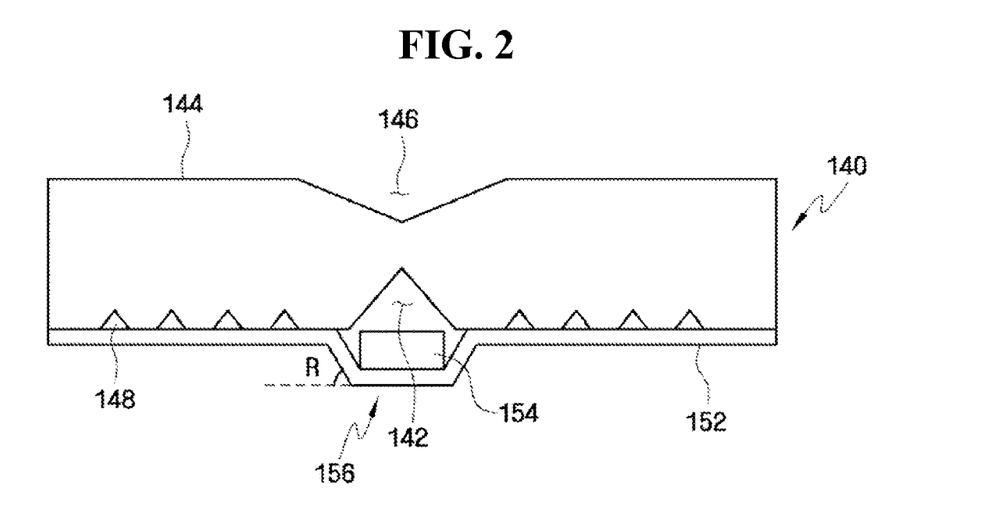
FIG. 2 is a cross sectional view of a backlight assembly, which is taken along line A-A' of FIG. 1.
Figure 3:
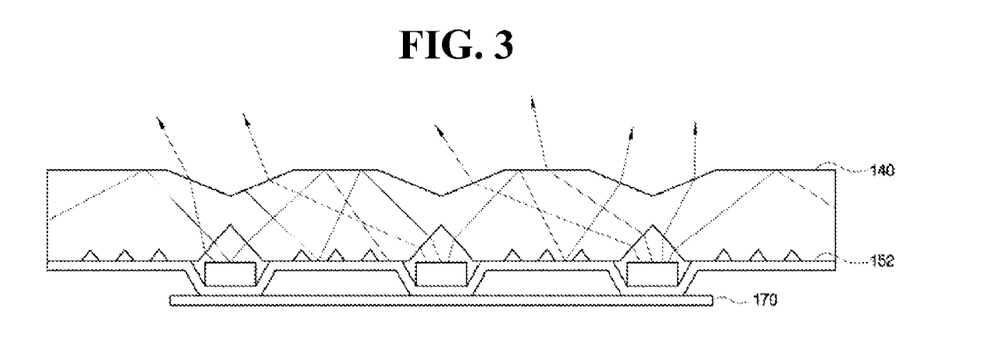
FIG. 3 is a cross sectional view showing a second circuit substrate added to the lowest portion of the backlight assembly of FIG. 2.

FIGS. 1 to 3 illustrate a display device in accordance with a first embodiment of the present invention. FIG. 1 is an exploded perspective view of the display device in accordance with the first embodiment of the present invention. FIG. 2 is a cross sectional view of a backlight assembly, which is taken along line A-A' of FIG. 1. FIG. 3 is a cross sectional view showing a second circuit substrate added to the lowest portion of the backlight assembly of FIG. 2.

Referring to FIG. 1, a display device 100 in accordance with the first embodiment of the present invention includes a display panel assembly 30, an upper receiving vessel 20 and a backlight assembly 10.

A liquid crystal panel assembly may be used as the display panel assembly 30. However, this is merely exemplary, and it is not limited thereto. For example, the display panel assembly 30 can also employ an OLED panel, or a panel employing any other suitable display technology. Here, the display panel assembly 30 includes a liquid crystal panel 31 having a lower display panel 32, an upper display panel 33, a liquid crystal layer (not shown) interposed between the upper and lower display panels, a gate tape carrier package 35, a data tape carrier package 34, and a printed circuit board 36.

The gate tape carrier package 35 is connected to each gate line (not shown) formed on the lower display panel 32, and the data tape carrier package 34 is connected to each data line (not shown) formed on the lower display panel 32.

Meanwhile, the printed circuit board 36 has mounted thereon various driving parts for providing a gate driving signal to the gate tape carrier package 35 and a data driving signal to the data tape carrier package 34.

Further, the backlight assembly 10 includes an intermediate frame 110, optical sheets 120, a diffusion plate 130, an optical member 140 and a light source assembly 150.

The light source assembly 150 includes a circuit substrate 152 having a circuit pattern, and a plurality of point light sources 154 spatially distributed, i.e. arranged separately from each other, upon the substrate 152.

The circuit substrate 152 has a generally rectangular shape, and may have a reflection surface. For example, the circuit substrate 152 may be surface-treated with a reflective material. Further, the circuit substrate 152 may be formed of a metal material to perform a heat dissipation function and a support function in lieu of a lower receiving vessel 160 as will be described later. No particular limitation is imposed on the metal material, and various metal materials having relatively high thermal conductivity may be used. The detailed configuration of the circuit substrate 152 will be described later with reference to FIG. 2.

Light emitting diodes (LEDs) or the like may be used as the point light sources 154. The point light sources 154 provide light such that the display device 100 can display image information. The light emitted from the point light sources 154 is guided toward the liquid crystal panel 31 through the optical member 140. The point light sources 154 may be separated from each other at regular intervals, for uniformity of luminance. For example, the point light sources 154 may be arranged in a matrix such that they are separated from each other at equal intervals in horizontal and vertical directions. Further, the point light sources 154 may be arranged generally in parallel in a vertical direction and arranged generally in a zigzag manner in a horizontal direction. As another example, the point light sources 154 may be arranged generally in parallel in a horizontal direction, and arranged generally in a zigzag in a vertical direction. However, the present invention is not limited thereto, and the point light sources 154 may be variously arranged on the substrate 152 in any suitable manner, to obtain uniformity of luminance. Further, fastening holes (not shown) into which fastening members (not shown) are inserted and fixed may be formed in the substrate 152.

The optical member 140 is disposed on the light source assembly 150. The optical member 140 may be formed of a material having a refractive index of about 1.2 to 1.8, e.g., polycarbonate or polymethyl methacrylate. Further, the optical member 140 is disposed on the circuit substrate 152 to cover the point light sources 154 on the circuit substrate 152. The optical member 140 is supplied with light from the point light sources 154 to guide the light toward the diffusion plate 130.

The optical member 140 may include groove portions 142, an emitting surface 144, and first and second optical patterns 146 and 148. The detailed structure of the optical member 140 will be described later with reference to FIG. 2.

The diffusion plate 130 is disposed on the optical member 140. The diffusion plate 130 acts to diffuse light emitted from the optical member 140. That is, the diffusion plate 130 serves to improve uniformity of luminance of the light generated from the light source assembly 150. Specifically, the diffusion plate 130 acts to remove bright spots directly over the point light sources 154, so that the individual point light sources 154 are not visible from the front surface of the display device 100. Further, the diffusion plate 130 may be separated from the optical member 140 by a predetermined distance while an air layer is interposed therebetween.

The optical sheets 120 are disposed on the diffusion plate 130 and serve to diffuse and condense light transmitted from light source assembly 150. The optical sheets 120 may include a diffusion sheet, a first prism sheet, a second prism sheet and the like.

In this case, the diffusion sheet is disposed above the light source assembly 150, and serves to improve uniformity of luminance, and luminance, of the light emitted from the light source assembly 150. The first prism sheet is disposed above the diffusion sheet. The first prism sheet has generally triangular prism patterns (not shown) that are formed in a predetermined arrangement on its surface to condense and emit the light diffused from the diffusion sheet. The second prism sheet is disposed above the first prism sheet. The second prism sheet can be a multilayer reflective polarization prism sheet which condenses, polarizes and emits the light. However, the second prism sheet may be omitted if the first prism sheet can provide sufficient luminance and a wide viewing angle.

The intermediate frame 110 receives the optical sheets 120, the diffusion plate 130, the optical member 140 and the light source assembly 150. In this embodiment, the intermediate frame 110 includes sidewalls formed along a generally rectangular edge, and an open window formed in its central portion to transmit the light having passed through the diffusion plate 130 and the optical sheets 120.

The display panel assembly 30 is disposed on the optical sheets 120, and is supported by the intermediate frame 110. Also, the display panel assembly 30 may be supported by a sidewall formed by extending the edge of the circuit substrate 152, as will be described later. A stepped portion or protrusion portion may be formed at an inner sidewall of the intermediate frame 110, to support the display panel assembly 30.

Further, the upper receiving vessel 20 is arranged to cover an upper surface of the display panel assembly 30. An open window is formed in a central portion of the upper receiving vessel 20 to expose an image-generating portion of the display panel assembly 30.

Next, a coupling relationship between the optical member 140 and the circuit substrate 152 will be described with reference to FIG. 2.

The use of light emitting diodes as the point light sources 154 generates the advantage of obtaining desired luminance with relatively low power consumption, but has the potential drawback of utilizing an additional optical member 140 on the circuit substrate 152 to more uniformly guide the light, as the light emitting diodes are point light sources. The diffusion plate 130 serves to diffuse the light for uniformity of luminance. However, there is a limitation in light diffusion with only the diffusion plate 130, and it is often desirable to guide the light to the diffusion plate 130. Accordingly, the optical member 140 may be provided not only to diffuse the light, but also to protect the point light sources 154.

The optical member 140 may include the groove portions 142, the emitting surface 144 and the first and second optical patterns 146 and 148. Although the optical member 140 is closely adhered, or affixed, to the circuit substrate 152 so as to be formed integrally with the circuit substrate 152 in this embodiment, the invention is not limited thereto, and may be a separate member. The optical member 140 may include a plurality of lenses separated from each other to correspond to the point light sources 154, respectively.

The groove portions 142 are respectively formed at positions corresponding to the point light sources 154 when the optical member 140 is closely adhered to the circuit substrate 152 to receive the point light sources 154. That is, each of the groove portions 142 is formed so as to be placed over one of the point light sources 154 when the optical member 140 is aligned properly with the circuit substrate 152. Each of the groove portions 142 is defined by a plurality of incident surfaces guiding the light emitted from the point light sources 154. More specifically, each of the groove portions 142 may have a concave shape that can be generally a circular cone or truncated cone shape, or another shape such as a polygonal cone shape like a triangular pyramid shape. The groove portions 142 serve to improve efficiency in guiding the light. The groove portions 142 may be removed from the optical member 140 if there is no problem in guiding the light.

The emitting surface 144 is an upper surface of the optical member 140 that emits the light incident to the groove portions 142. The emitting surface 144 may cover the entire upper surface of the optical member 140, such that the entire surface of the display panel can have a substantially uniform luminance. The first and second optical patterns 146 and 148 may also at least partially reflect light, further diffusing light from the point light sources 154.

The first optical patterns 146 are formed above the groove portions 142, i.e., at positions corresponding to locations of the groove portions 142. The first optical patterns 146 reflect a portion of the light guided by the groove portions 142. As described above, if all of the light incident on the groove portions 142 is transmitted through portions of the emitting surface 144 above the groove portions 142, luminance will appear high only at positions corresponding to the groove portions 142 in the entire panel, resulting in non-uniform luminance or illumination of the display panel. Accordingly, in order that the light can be emitted also from portions of the emitting surface 144 away from the point light sources 154, a portion of the light incident on the groove portions 142 reflects off of first optical patterns 146, and is diffused laterally within the optical member 140.

The second optical patterns 148 are formed adjacent to the groove portions 142. As described above, the second optical patterns 148 reflect light such as that light diffused into optical member 140 by the first optical patterns 146, directing the light up and through the emitting surface 144. Accordingly, the light emitted from the point light sources 154 is diffused throughout optical member 140 and then reflected out by patterns 148, more uniformly diffusing light and thereby obtaining more uniform luminance.

The optical member 140 has a relatively large thickness compared to some other components, and depending on requirements, there may be a specific ratio (or ratios) of the thickness of the optical member 140 to the total thickness of the backlight assembly 10. Accordingly, it is desirable to reduce the thickness of the optical member 140 in order to make the display device slim. The optical member 140 includes the groove portions 142 having a predetermined shape, and covering the point light sources 154. It is further desirable for the shapes of the groove portions 142 to allow for sufficient space to accommodate the height of the point light sources 154, in order to safely install the point light sources 154 in the groove portions 142.

To further accommodate the point light sources 154, as shown in FIG. 2, the circuit substrate 152 in accordance with the first embodiment of the present invention has a plurality of recess, or recessed, portions 156 formed to protrude downward such that the point light sources 154 are embedded in the recess portions 156. This effectively allows the thickness of the optical member 140 to be reduced. The recess portions 156 can be formed to protrude downward from the circuit substrate 152 by approximately the height of the point light sources 154, so that the thickness of the optical member 140 can be reduced by approximately the height of the light sources 154. However, the depth of the recess portions 156 protruding downward is not necessarily limited to the height of the point light sources 154, and if necessary, the protruded length of the recess portions 156 may be larger or smaller than the height of the point light sources 154.

As described above, the circuit substrate 152 may be formed of a metal material. The rear surface of the circuit substrate 152 at protruded positions of the recess portions 156 may have a substantially flat surface without either protrusions or depressions. Accordingly, the circuit substrate 152 may be directly coupled to an external case of the display device without the lower receiving vessel 160.

An inclination angle R of a bent portion of each of the recess portions 156 may be changed according to the desired shape of the recess portions 156. The inclination angle R may range, for example, from about 5 to about 135 degrees. In particular, the inclination angle of the bent portion of the recess portions 156 may be determined within a range not causing a short circuit failure in the circuit substrate 152.

In order to support the intermediate frame 110, the optical sheets 120, the diffusion plate 130, the optical member 140 and the light source assembly 150, a sidewall extending from the edge of the circuit substrate 152 may be formed such that the components forming the display device are supported by the sidewall.

Further, the circuit substrate 152 may include a plurality of fastening grooves (not shown) into which fastening members (not shown) are inserted, the fastening members coupling the circuit substrate 152 with the components disposed at upper and lower sides. The configuration of such fastening grooves and fastening members is known. The printed circuit board 36 of the display panel assembly 30 may be safely installed at the sidewall or the rear surface of the circuit substrate 152.

Next, FIG. 3 is a cross sectional view showing a configuration in which another circuit substrate 170 is directly coupled to recess portions 156 of circuit substrate 152. For convenience of explanation, the circuit substrate 152 is referred to as a first circuit substrate, and the another circuit substrate 170 provided below the circuit substrate 152 is referred to as a second circuit substrate. The first circuit substrate 152 receives a signal transmitted from the second circuit substrate 170 to operate the point light sources 154, so that the backlight assembly 10 emits light. The first circuit substrate 152 and the second circuit substrate 170 are connected to each other by wiring. The rear surfaces of the recess portions 156 protruding downward from the first circuit substrate 152 are substantially flat surfaces. Accordingly, the recess portions 156 may serve as supports. Fastening grooves can be formed at regions where the first circuit substrate 152 is in contact with the second circuit substrate 170, and fasteners can be coupled between the fastening grooves, thereby fixing the second circuit substrate 170 on the rear surface of the first circuit substrate 152.

The point light sources 154 are located in the recess portions 156 of the first circuit substrate 152, as described above. Accordingly, as above, it is possible to reduce the thickness of the optical member 140 by the height of the point light sources 154, thereby achieving a slimmer and lighter display device. Thus, embodiments of the invention allow for lower-profile, lighter display devices.

Figure 4:
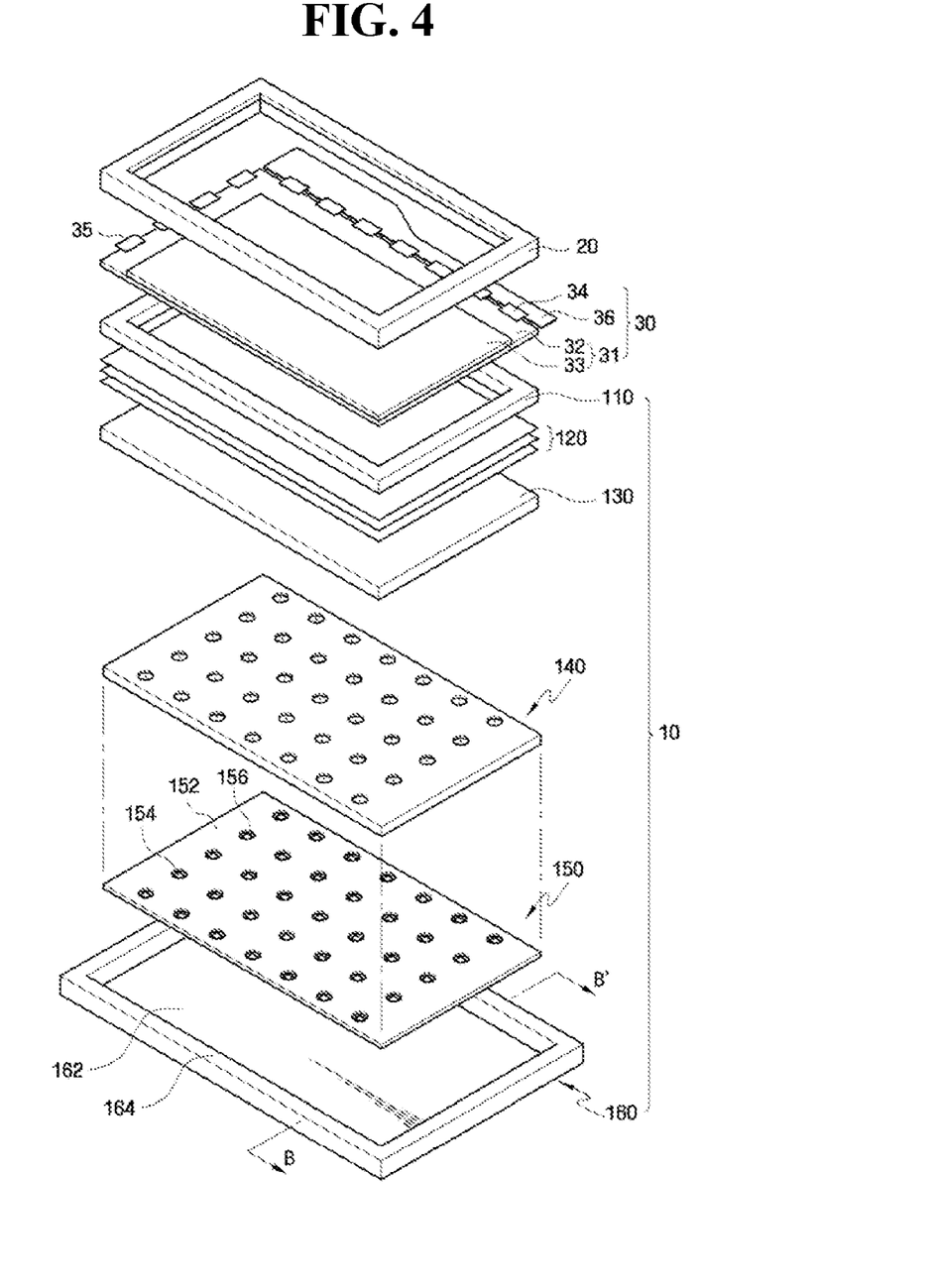
FIG. 4 is an exploded perspective view of a display device in accordance with a second embodiment of the present invention.
Figure 5:
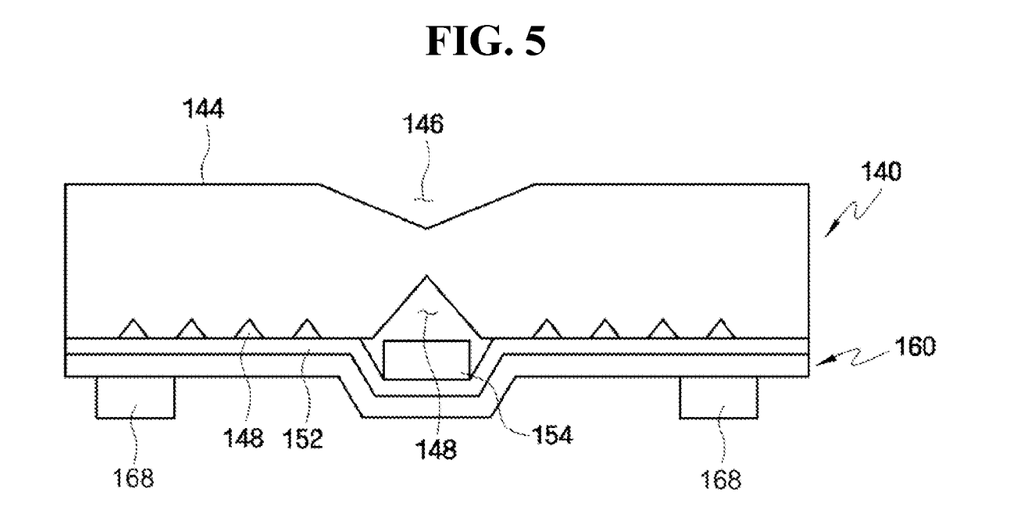
FIG. 5 is a cross sectional view of a backlight assembly, which is taken along line B-B' of FIG. 4.

Next, a display device in accordance with a second embodiment of the present invention will be described with reference to FIGS. 4 and 5. FIG. 4 is an exploded perspective view of a display device in accordance with the second embodiment of the present invention. FIG. 5 is a cross sectional view of an assembled backlight assembly, which is taken along line B-B' of FIG. 4.

The second embodiment of the present invention has a configuration similar to that of the first embodiment, except that a lower receiving vessel 160 is added.

As with the first embodiment, the backlight assembly 10 includes the intermediate frame 110, the optical sheets 120, the diffusion plate 130, the optical member 140, the light source assembly 150 and the lower receiving vessel 160.

The lower receiving vessel 160 includes a bottom portion 162, and sidewalls 164 extending from the bottom portion 162 to provide a receiving space accommodating the optical sheets 120, the diffusion plate 130, the optical member 140 and light source assembly 150. Particularly, the lower receiving vessel 160 may be formed of metal having high thermal conductivity, thus performing a heat dissipation function.

A reflection plate may be provided on the bottom portion 162 of the lower receiving vessel 160. If the light emitted from the point light sources 154 is reflected by the diffusion plate 130 or the like to travel downward as will be described later, the reflection plate may reflect the light back upward, so as to improve luminance. The reflection plate may include any material capable of reflecting light, e.g., polyethyleneterephthalate and aluminum. The shape of the rear surface of the lower receiving vessel 160 may be changed according to the shape of the first circuit substrate 152. That is, the lower receiving vessel 160 may be proximate to or affixed to the rear surface of the first circuit substrate 152. The lower receiving vessel 160 may have bent portions protruding downward and positioned corresponding to the recess portions 156, so as to accommodate those recess portions 156.

The lower receiving vessel 160 may further include a support structure 168 provided below the lower receiving vessel 160 to support the lower receiving vessel 160. The support structure 168 can be fastened to the lower receiving vessel 160, and also be formed to have a predetermined height. The support structure 168 may be coupled to an external case of the display device. In this configuration, the entire backlight assembly 10 is supported by the lower receiving vessel 160, meaning that in at least some orientations, the entire weight of the backlight assembly 10 is applied to the lower receiving vessel 160. The support structure 168 also serves to prevent the lower receiving vessel 160 from being bent or deformed by this weight.

The support structure 168 is formed to have a height equal to or larger than the depth of the bent portions protruding downward from the lower receiving vessel 160. Thus, the thickness of the backlight assembly 10 is not changed by the recess portions 156, whereas the thickness of the optical member 140 is reduced by the height of the point light sources 154, thereby reducing the total thickness of the backlight assembly 10.

In the first embodiment, the rear surfaces of the recess portions 156 are formed of metal, and function as the support structure 168 without the lower receiving vessel 160. In contrast, the second embodiment includes a separate support structure 168 to support the backlight assembly 10.

Fastening grooves (not shown) into which fastening members (not shown) are inserted and fixed may be formed in the bottom portion 162 of the lower receiving vessel 160. Further, the printed circuit board 36 of the display panel assembly 30 may be bent along the sidewalls 164 of the lower receiving vessel 160 to be safely installed at the sidewall or the rear surface of the lower receiving vessel 160. A second circuit substrate (not shown) may also be coupled to the rear surface of the lower receiving vessel 160, similar to the configuration of FIG. 3. In this case, the shape of the lower receiving vessel 160 may be variously changed according to the manner in which the optical sheets 120, the diffusion plate 130, the light source assembly 150, the optical member 140 and the display panel assembly 30 are received in the lower receiving vessel 160.

Figure 6:
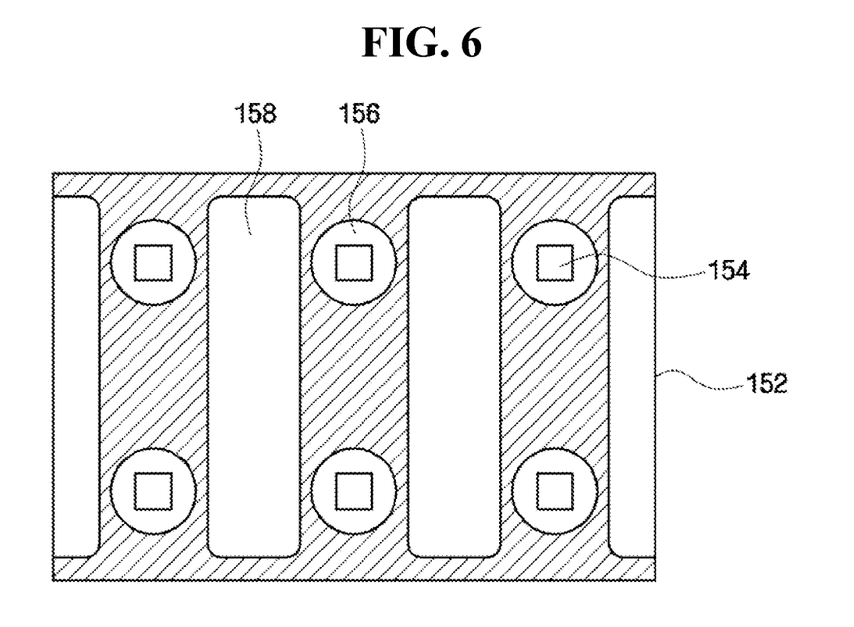
FIGS. 6 and 7 illustrate a first circuit substrate in accordance with a third embodiment of the present invention.
Figure 7:
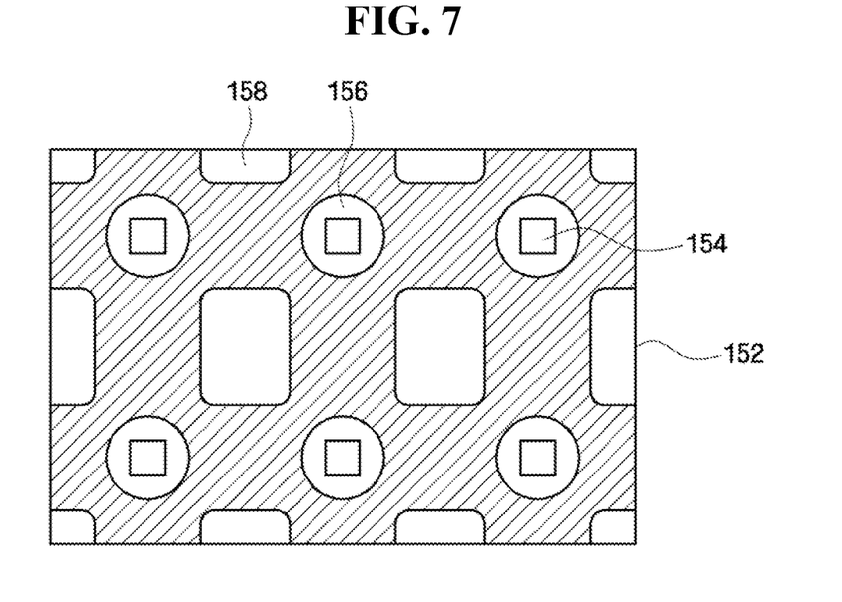

Next, a display device in accordance with a third embodiment of the present invention will be described with reference to FIGS. 6 and 7. FIGS. 6 and 7 illustrate a first circuit substrate 152 in accordance with the third embodiment of the present invention.

The first circuit substrate 152 of the display device in accordance with the third embodiment of the present invention includes openings 158 which are cutouts formed in regions other than those where the recess, or recessed, portions 156 are formed. The openings 158 are empty spaces or gaps cut in the first circuit substrate 152 as shown in FIGS. 6 and 7, and may be formed by cutting portions of the first circuit substrate 152 after manufacturing the first circuit substrate 152.

By forming the openings 158 or cutouts in areas not affecting circuit wirings formed in the first circuit substrate 152, it is possible to reduce the total weight of the backlight assembly 10. Particularly, if the first circuit substrate 152 is formed of metal, it is possible to significantly reduce the total weight of the backlight assembly 10. The openings 158 may be formed in a general stripe shape as shown in FIG. 6. Alternatively, the openings 158 may be formed such that a remaining portion of the first circuit substrate 152 has a general net shape as shown in FIG. 7, i.e. with openings 158 at regular intervals on the circuit substrate 152. The openings 158 are shown as rectangular or squarelike, but can be any shape. The first circuit substrate 152 may be formed in various shapes to reduce the weight of the backlight assembly 10.

The remaining components of the display of the third embodiment can be substantially the same as other embodiments such as the second embodiment, and thus any repetitive description thereof will be largely omitted.

Figure 8:
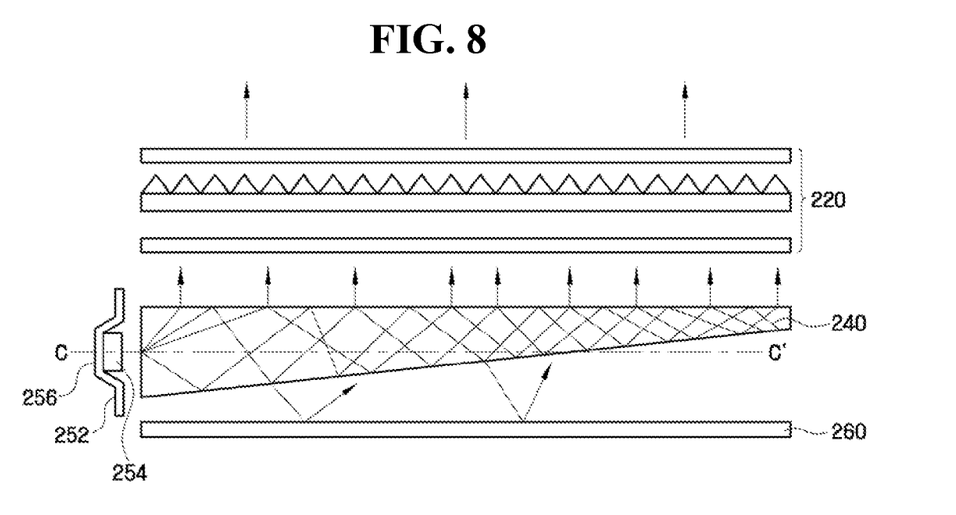
FIG. 8 is a cross sectional view of a backlight assembly of a display device in accordance with a fourth embodiment of the present invention.
Figure 9:
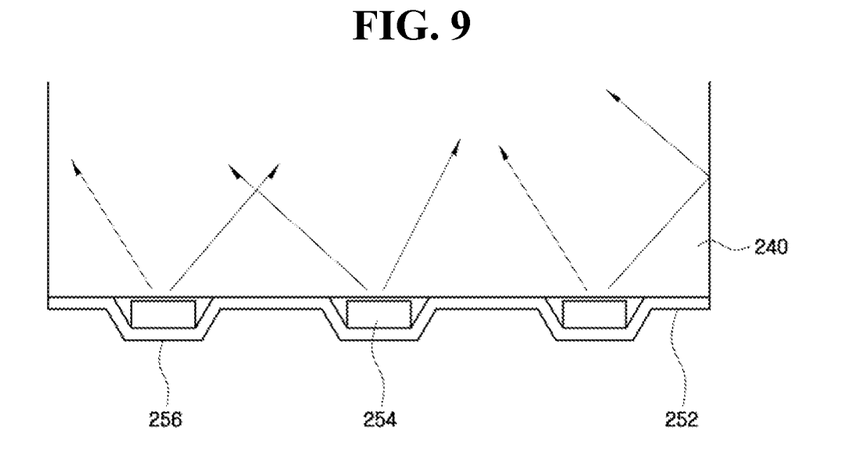
FIG. 9 is a cross sectional view of the backlight assembly, which is taken along line C-C' of FIG. 8.

Next, a display device in accordance with a fourth embodiment of the present invention will be described with reference to FIGS. 8 and 9. FIG. 8 is a cross sectional view of a backlight assembly of a display device in accordance with a fourth embodiment of the present invention. FIG. 9 is a cross sectional view of the backlight assembly, which is taken along line C-C' of FIG. 8.

The display device in accordance with the fourth embodiment of the present invention includes edge-type light sources instead of direct-type light sources. A first circuit substrate 252 having a plurality of point light sources 254 is located at one side end of a light guiding plate 240, such that light emitted from the point light sources 254 is incident into the light guiding plate 240. The light incident into the light guiding plate 240 is guided by the light guiding plate 240 to be emitted upward in FIG. 8. If a portion of the light is emitted downward in FIG. 8, it is reflected back upward by a reflection plate 260, thereby reducing optical loss.

The light emitted from the light guiding plate 240 is incident to a plurality of optical sheets 220. The optical sheets 220 are provided above the light guiding plate 240. The optical sheets 220 can include a diffusion sheet, a first prism sheet, a second prism sheet and the like, to more uniformly diffuse the incident light and to guide the light to the display panel assembly 30.

Referring to FIG. 9, the first circuit substrate 252 may be positioned to contact a side surface of the light guiding plate 240. In this case, if the heat generated from the first circuit substrate 252 is held between the first circuit substrate 252 and the light guiding plate 240, the point light sources 254 may be damaged or malfunction. Accordingly, the first circuit substrate 252 may be formed of a metal material having relatively high thermal conductivity, so as to more easily transfer the heat generated from the first circuit substrate 252 to the outside. Further, it is possible to ensure a space between the first circuit substrate 252 and the light guiding plate 240 by setting the depth of recess (or recessed) portions 256 to be larger than the height of the point light sources 254.

In addition, as in the third embodiment, openings (not shown) can be formed in the first circuit substrate 252, thereby reducing the weight of the first circuit substrate 252. Particularly, if the first circuit substrate 252 is formed of metal, the formation of these openings can result in significant weight savings.

By this configuration, it is possible to reduce a distance between the first circuit substrate 252 and the light guiding plate 240. Therefore, it is possible to reduce the width of the display device having edge-type light sources, and to reduce the weight of the backlight assembly.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A backlight assembly comprising:
   a first substrate;
   a second substrate configured to provide a signal to the first substrate;
   point light sources disposed on the first substrate; and
   an optical member covering the point light sources to guide light emitted from the point light sources,
   wherein the first substrate has recessed portions, and the point light sources are disposed within the recessed portions,
   wherein a depth of the recessed portions is greater than a thickness of the first substrate, and
   wherein the first substrate is a circuit substrate having a circuit pattern,
   wherein the first substrate further includes cutouts, the cutouts being formed between the recessed portions, and
   wherein the recessed portions have substantially flat rear surfaces, and the second substrate is coupled to the substantially flat rear surfaces of the recessed portions of the first substrate.

2. The backlight assembly of claim 1, wherein the point light sources are spatially distributed on the first substrate.

3. The backlight assembly of claim 1, wherein the recessed portions extend generally away from the optical member.

4. The backlight assembly of claim 1, wherein each of the recessed portions has a bent portion oriented at an inclination angle, and the inclination angle ranges from about 5 degrees to about 135 degrees.

5. The backlight assembly of claim 1, wherein the optical member is affixed to the first substrate.

6. The backlight assembly of claim 1,
   wherein the optical member including a light incident surface face the point light sources and a light emitting surface,
   wherein the optical member includes concave groove portions recessed from the light incident surface, the concave groove portions being respectively formed at positions corresponding to the point light sources so as to be positioned over the point light sources, and
   each of the concave groove portions is defined by incident surfaces guiding the light emitted from the point light sources.

7. The backlight assembly of claim 6, wherein the optical member includes an optical pattern positioned above the concave groove portions so as to reflect at least a portion of the light guided by the concave groove portions.

8. The backlight assembly of claim 7, wherein the optical pattern and the concave groove portions are aligned with at least one of the point light sources.

9. The backlight assembly of claim 1, wherein a depth of the recessed portions is generally equal to or greater than a height of the point light sources.

10. The backlight assembly of claim 1, further comprising a lower receiving vessel disposed below the first substrate and having bent portions protruding away from the optical member, the bent portions being positioned corresponding to the recess portions so as to receive the recessed portions.

11. The backlight assembly of claim 10, wherein the lower receiving vessel is affixed to a rear surface of the first substrate.

12. The backlight assembly of claim 10, wherein the second substrate is coupled to a lower portion of the lower receiving vessel.

13. The backlight assembly of claim 10, further comprising a support structure provided below the lower receiving vessel to support the lower receiving vessel, the supporting structure being formed between the recessed portions.

14. The backlight assembly of claim 13, wherein the support structure has a height generally equal to or greater than a depth of the bent portions.

15. The backlight assembly of claim 1, wherein the first substrate comprises metal.

16. The backlight assembly of claim 15, wherein the first substrate further comprises at least one sidewall extending substantially perpendicular to the first substrate.

17. The backlight assembly of claim 1, wherein optical sheets are stacked on the optical member.

18. The backlight assembly of claim 17, wherein the optical member is generally separated from the optical sheets by a predetermined distance.

19. The backlight assembly of claim 1, wherein the point light sources are light emitting diodes.

20. The backlight assembly of claim 1, wherein the point light sources are disposed in matrix form.

21. A display device comprising:
a backlight assembly which includes a first substrate, a second substrate configured to provide a signal to the first substrate, point light sources spatially distributed on the first substrate, and an optical member covering the point light sources to guide light emitted from the point light sources,
wherein the first substrate has recessed portions extending generally away from the optical member, and the point light sources are positioned within the recessed portions; and
a display panel which is positioned to receive light emitted from the backlight assembly in order to display an image,
wherein a depth of the recessed portions is greater than a thickness of the first substrate,
wherein the first substrate is a circuit substrate having a circuit pattern,
wherein the first substrate further includes cutouts, the cutouts being formed between the recessed portions, and
wherein the recessed portions have substantially flat rear surfaces, and the second substrate is coupled to the substantially flat rear surfaces of the recessed portions of the first substrate.

22. A backlight assembly comprising:
a first substrate;
a second substrate configured to provide a signal to the first substrate;
point light sources disposed on the first substrate;
an optical member covering the point light sources to guide light emitted from the point light sources; and
a lower receiving vessel disposed below the first substrate and having bent portions protruding away from the optical member, the bent portions being positioned corresponding to the recess portions so as to receive the recessed portions,
wherein the first substrate has recessed portions, and the point light sources are disposed within the recessed portions,
wherein a depth of the recessed portions is greater than a thickness of the first substrate,
wherein the first substrate is a circuit substrate having a circuit pattern, and
wherein the recessed portions and a corresponding lower portion of the lower receiving vessel have substantially flat rear surfaces, and the second substrate is coupled to the lower portion of the lower receiving vessel.

23. The backlight assembly of claim 22, further comprising a support structure provided below the lower receiving vessel to support the lower receiving vessel, the supporting structure being formed between the recessed portions.

24. A backlight assembly comprising:
a first substrate;
a second substrate configured to provide a signal to the first substrate;
point light sources disposed on the first substrate;
an optical member covering the point light sources to guide light emitted from the point light sources,
wherein the first substrate has recessed portions, and the point light sources are disposed within the recessed portions,
wherein a depth of the recessed portions is greater than a thickness of the first substrate,
wherein the first substrate is a circuit substrate having a circuit pattern, and
wherein the recessed portions have substantially flat rear surfaces, and the second substrate is coupled to the substantially flat rear surfaces of the recessed portions of the first substrate.

25. The backlight assembly of claim 21, further comprising a lower receiving vessel disposed below the first substrate and having bent portions protruding away from the optical member, the bent portions being positioned corresponding to the recessed portions so as to receive the recessed portions.

26. The backlight assembly of claim 25, further comprising a support structure provided below the lower receiving vessel to support the lower receiving vessel, the supporting structure being formed between the recessed portions.

27. A display device comprising:
a backlight assembly which includes a first substrate, a second substrate configured to provide a signal to the first substrate, point light sources spatially distributed on the first substrate, and an optical member covering the point light sources to guide light emitted from the point light sources, wherein the first substrate has recessed portions extending generally away from the optical member, and the point light sources are positioned within the recessed portions;
a display panel which is positioned to receive light emitted from the backlight assembly in order to display an image; and
a lower receiving vessel disposed below the first substrate and having bent portions protruding away from the optical member, the bent portions being positioned corresponding to the recess portions so as to receive the recessed portions,
wherein a depth of the recessed portions is greater than a thickness of the first substrate,
wherein the first substrate is a circuit substrate having a circuit pattern, and
wherein the recessed portions and a corresponding lower portion of the lower receiving vessel have substantially flat rear surfaces, and the second substrate is coupled to the lower portion of the lower receiving vessel.

28. The backlight assembly of claim 27, further comprising a support structure provided below the lower receiving vessel to support the lower receiving vessel, the supporting structure being formed between the recessed portions.

29. A display device comprising:
a backlight assembly which includes a first substrate, a second substrate configured to provide a signal to the first substrate, point light sources spatially distributed on the first substrate, and an optical member covering the point light sources to guide light emitted from the point light sources, wherein the first substrate has recessed portions extending generally away from the optical member, and the point light sources are positioned within the recessed portions;

a display panel which is positioned to receive light emitted from the backlight assembly in order to display an image, wherein a depth of the recessed portions is greater than a thickness of the first substrate, wherein the first substrate is a circuit substrate having a circuit pattern, and wherein the recessed portions have substantially flat rear surfaces, and the second substrate is directly coupled to the substantially flat rear surfaces of the recessed portions of the first substrate.

* * * * *